United States Patent [19]

Oda

[11] 4,448,025
[45] May 15, 1984

[54] PROCESS FOR RECOVERING EXHAUST HEAT

[76] Inventor: Kenichi Oda, 4-4-24, Tsujidomotomachi, Fujisawa, Japan

[21] Appl. No.: 286,006

[22] Filed: Jul. 22, 1981

[30] Foreign Application Priority Data

Aug. 1, 1980 [JP]  Japan ................... 55-106630

[51] Int. Cl.$^3$ ............................................ F01K 25/10
[52] U.S. Cl. ........................................ 60/651; 252/67
[58] Field of Search ..................... 60/651, 671; 252/67

[56] References Cited

U.S. PATENT DOCUMENTS

| | | | |
|---|---|---|---|
| 3,234,734 | 2/1966 | Buss et al. | 60/651 |
| 3,237,403 | 3/1966 | Feher | 60/647 |
| 3,282,048 | 11/1966 | Murphy et al. | 60/647 |
| 3,516,248 | 6/1970 | McEwen | 60/651 |
| 3,841,099 | 10/1974 | Somekh | 60/671 |
| 3,940,939 | 3/1976 | Davis | 60/671 X |
| 4,232,525 | 11/1980 | Enjo | 60/671 |

*Primary Examiner*—Allen M. Ostrager
*Attorney, Agent, or Firm*—Oldham, Oldham, Hudak, Weber & Sand Co.

[57] ABSTRACT

The present invention relates to a process for recovering the exhaust heat using the working fluid of the toluene (or benzene)-water system in the vapor cycle, when the moderate heat energy of 400°–750° C. is converted into work.

In practice, in order to obtain the maximum overall thermal efficiency $\eta m$, the working fluid of the Rankine cycle in the recovery of exhaust heat of the temperature of 400°–700° C. is suitable to be the mixture of toluene (or benzene) and water containing 20–80 mol. % of water, while the working fluid of the reheating cycle in the recovery of exhaust heat of the temperature of 600°–750° C. is suitable to be the mixture of toluene (or benzene) and water containing 45–90 mol. % of water in considerations of the thermodynamic efficiency of vapor cycle, the performance of the exhaust heat boiler and other factors.

4 Claims, 5 Drawing Figures

PROCESS FOR RECOVERING EXHAUST HEAT

BACKGROUND OF THE INVENTION

The present invention relates to a process for recovering the exhaust heat taking aim at the improvement of thermal efficiency, when the moderate heat energy is converted into work. In more detailed, the present invention relates to the process for recovering the exhaust heat using the working fluid of the toluene-water system or the benzene-water system in the vapor cycle, when the heat energy of 400°–750° C. is converted into work.

For the purpose of improvement of thermal efficiency in the power generation from fossil fuels, the combined cycle being combined the gas turbine with the steam cycle is expected as the most realizable and expected process. However, at present, the thermal efficiency of the steam cycle for recovering the exhaust heat of about 500° C. coming out from the gas turbine is low. In the present technical level of the gas turbine, the thermal efficiency of said combined cycle is about 40% slightly above the thermal efficiency of conventional boiler turbine unit. Therefore, it has been the problems of the research and development to improve the thermal efficiency of the gas turbine by operating the gas turbine at the high temperature, and to improve the thermal efficiency of the steam cycle due to increasing the temperature of the exhaust heat coming out from the gas turbine.

The present invention aims at the improvement of recovering the exhaust heat independent of the improvement of performance of the gas turbine. As the result of studying the various sorts of substances other than steam suitable for the working fluid of the vapor cycle, the present invention has been accomplished by finding the fact that the mixture of toluene (or benzene) and water is useful to use for the working fluid.

When the Rankine cycle is considered to be the standard cycle of the vapor cycle, the most simple method of estimating the thermal efficiency of cycle is shown as follows:

If the inlet temperautre of turbine is Tc°K.; the pressure is Pc; and the condensation temperature is Ta°K., and if the vapor pressure of the saturated vapor at Ta°K. is Pa (the back pressure of turbine); the heat of evaporation per one mole of the working fluid at Ta°K. is La; the molecular heat of vapor is the constant value Cp, and also if the vapor submits to the rule of the ideal gas, the theoritical thermal efficiency ηc of the cycle is roughly estimated as follows:

$$\eta c = \frac{\sigma}{\sigma + \lambda - 1} (1 - \psi^{-\alpha}) \quad (1)$$

wherein $\theta = Tc/Ta$, $\lambda = La/Ta.Cp$, $\psi = Pc/Pa$, $\alpha = R/Cp$ (R: gas constant), $\theta$, $\lambda$, $\psi$, $\alpha$ are non-dimentional parameters respectively.

The outlet temperature of vapor coming from turbine Td°K. is shown in the following formual.

$$Td = Tc \cdot \psi^{-\alpha} \quad (2)$$

From said formula (1), the tendency of the parameter value suitable for increase the value of ηc is known.

In this case, in order to avoid the condensation of vapor in the low pressure stage of the turbine, it is necessary to be Td≧Ta, whereby the value of Pc is limited by the condition of $\psi^\alpha \geq \theta$.

And, considering that the preferable condition of the working fluid is the condition in which entropy of the saturated vapor is not too much change within the operating range of the working fluid according to the temperature change, the value of λ is desirable to be near to 1.

The thermal stability, the cost, the poisonous character and the corrosive property against the metal material are the fundamental terms of the working fluid. Benzene and toluene are selected for the working fluid suitable to said fundamental terms. The thermal efficiency ηc of the cycle is roughly calculated according to said formula. The result is shown in the table 1 in comparison with the working fluid of water.

From the values of λ and α in the table 1, it has been understood that the specific characters of benzene and toluene as the working fluid are completely adverse against those of water. In the working fluids of benzene and toluene, when the value Pc is more than 100 kg/cm² which is shown in the table 1, the value ηc can be increased according to the account. When the value Pc is more than 100 kg/cm², the thermal efficiency does not substantially increase, since the power of pump for feeding the working fluid to the boiler increases. On the assumption that the value La of the working fluid is the same extent to that of benzene or toluene, it is preferable to select the working fluid having the intermediate value of Cp between that of toluene (or benzene) and that of water. As the pure substance having said intermediate value of Cp cannot be found and rather does not present, the mixture of toluene (or benzene) and water has been adopted to the working fluid of the present invention.

TABLE 1

| | Rough estimate of the thermal efficiency ηc of cycle | | | | |
|---|---|---|---|---|---|
| | Benzene | Toluene | Water | Mixture* of benzene and water | Mixture* of toluene and water |
| Pa 35° C. kg/cm² | 0.201 | 0.0635 | 0.0492 | 0.258 | 0.121 |
| La 35° C. cal/mol | 7919 | 8924 | 9407 | 9163 | 9665 |
| Cp** cal/mol °C. | 37.74 | 46.58 | 8.639 | 23.19 | 27.61 |
| λ = La/Ta.Cp | .681 | .854 | 3.865 | 1.282 | 1.136 |
| α = R/Cp | .0526 | .0426 | .230 | .0856 | .0719 |
| 1 − ψ^−α*** | .279 | .269 | (.820)**** | .400 | .384 |
| Inlet temperature | | | | | |
| ηc % { 380° C. | 32.8 | 32.8 | (34.9)***** | 35.3 | 36.0 |
| ηc % { 400° C. | 32.6 | 32.6 | (35.5) | 35.4 | 36.1 |

TABLE 1-continued

| | Rough estimate of the thermal efficiency ηc of cycle | | | | |
|---|---|---|---|---|---|
| | Benzene | Toluene | Water | Mixture* of benzene and water | Mixture* of toluene and water |
| 420° C. | 32.5 | 32.4 | (36.1) | 35.5 | 36.1 |

*1 mol:1 mol mixture
**Molecular heat at 600° K.
***Inlet pressure of the turbine is assumed to 100 kg/cm²
****In this condition, the condensation of water occurs at the low pressure side of the turbine
*****The calculation value according to the formula (1)

Although the study has been carried out according to the rough calculation formula as shown above, the real vapor at high pressure is deviant from the ideal gas, and the molecular heat is also the function of temperature. Exactly, it is necessary to calculate the values of enthalpy and entropy in each condition respectively.

DETAILED DESCRIPTION OF THE PREFERRED EMBODIMENTS

Figure 1:
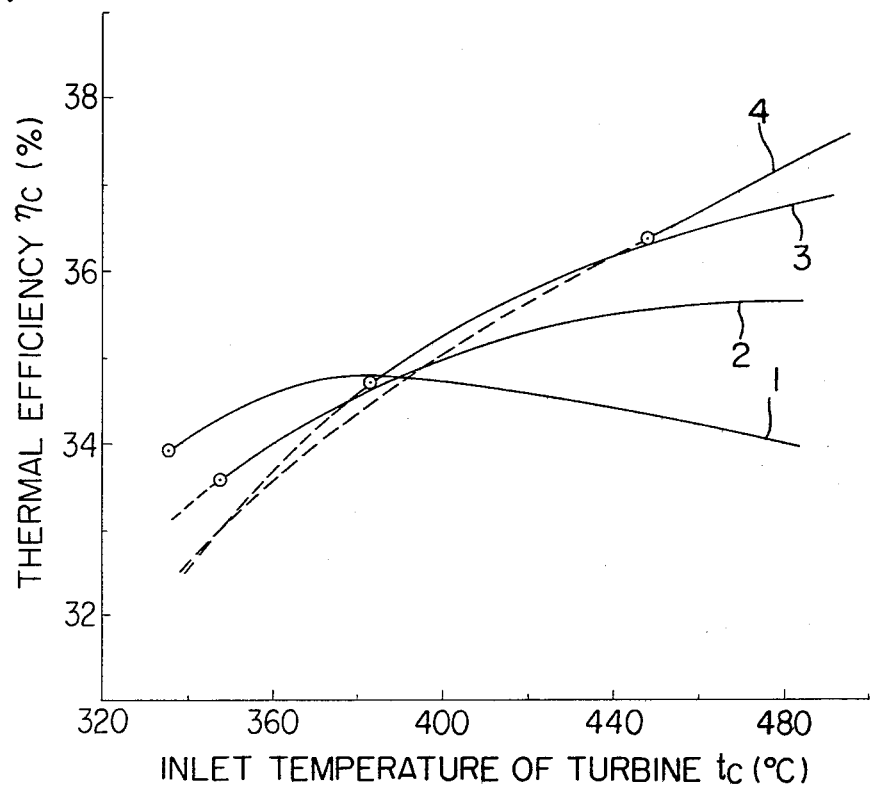
FIG. 1 shows the graph of indicating the interrelationship between the thermal efficiency $\eta c$ (%) of cycle and the inlet temperature $t_c$ (°C.) of turbine using the working fluid of the benzene-water system.

In FIG. 1, curve 1 shows the interrelationship between the thermal efficiency $\eta c$ (%) of cycle and the inlet temperature $t_c$ (°C.) of turbine, when the working fluid is benzene only. The curves 2, 3 and 4 show the interrelationship between the thermal efficiency $\eta c$ (%) of cycle and the inlet temperature $t_c$ (°C.) of turbine, when the working fluids of the benzene-water system in the ratio of 0.5, 1.0 (0.9026) and 2.0 moles of water per one mole of benzene respectively are used.

Figure 2:
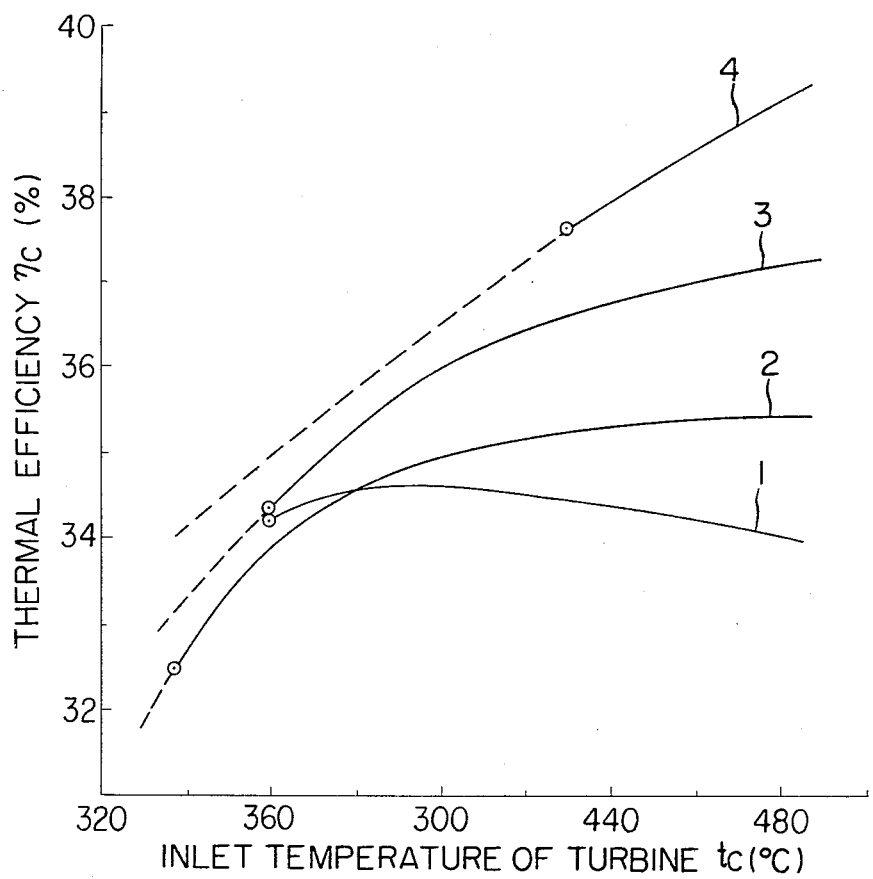
FIG. 2 shows the graph of indicating the interrelationship between the thermal efficiency $\eta c$ (%) of cycle and the inlet temperature $t_c$ (°C.) of turbine using the working fluid of the toluene-water system.

In FIG. 2, curve 1 shows the interrelationship between the thermal efficiency $\eta c$ (%) of cycle and the inlet temperature $t_c$ (°C.) of turbine, when the working fluid is toluene only. The curves 2, 3 and 4 show the interrelationship between the thermal efficiency $\eta c$ (%) and the inlet temperature $t_c$ (°C.) of turbine, when the working fluids of the toluene-water system in the ratio of 0.5, 1.0 (0.9026) and 2.0 moles of water per one mole of toluene respectively are used. In FIGS. 1 and 2, the inlet pressure of turbine is 100 kg/cm², the condensation temperature is 35° C. and the assumption that the mixed vapor of toluene (or benzene) and water is complied with the rule of the ideal solution is set up. From FIGS. 1 and 2, it has been observed that when the working fluid is benzene or toluene only, the value of the thermal efficiency $\eta c$ is almost same to each other. In considerations that the thermal efficiency $\eta c$ indicates the maximum value at the relatively low inlet temperature $t_c$ of turbine, and that even if the inlet pressure of turbine is more than 100 kg/cm², the improvement of the thermal efficiency is impossible, the operating condition is limited. When the mixture of toluene (or benzene) and water is used for the working fluid, the thermal efficiency $\eta c$ tends to increase with the increase of the inlet temperature $t_c$ (°C.) of turbine. The addition of water to toluene gives great influence to the improvement of the thermal efficiency in comparison with the addition of water to benzene. The curves shown by the dotted line in FIGS. 1 and 2 indicate the case that the condensation of vapor occurs at the low pressure vapor of turbine.

When more than 2 moles of water are mixed with one mole of benzene or toluene, it occurs small increase to the thermal efficiency $\eta c$. However, the inlet temperature $t_c$ of turbine in which the condensation of vapor occurs at the low pressure stage of turbine moves to the high temperature.

The more the inlet pressure of turbine comes to high, the more the thermal efficiency $\eta c$ becomes large. Therefore, it is desirable to set the inlet pressure of turbine for at least more than 70 kg/cm². When the mixing ratio of water to the working fluid is small, the power of pump for feeding the working fluid to the boiler increases, while when the mixing ratio of water to the working fluid is large, the condensation of vapor occurs at the low pressure stage of turbine. Ordinally, the inlet pressure of turbine is suitable to be 100 kg/cm, and is 150 kg/cm² at the maximum.

In the actual exhaust heat recovery, the exhaust gas is heat-exchanged with the working fluid by flowing them in the counter-current direction in the boiler.

In order to absorb with the working fluid, at the high rate, the heat of exhaust gas in which enthalpy almost straightly increases according to the increase of temperature, it is desirable to straightly increase enthalpy of the working fluid with the increase of temperature. As the phase change of the working fluid occurs in the vapor cycle, said demand is essentially unreasonable. However, above the critical state, said demand can be satisfactory at the nearly possible condition. When water is used for the working fluid below the critical pressure, as in conventional case, enthalpy at the temperature of starting on boiling makes the pinch point of the heat exchange between the exhaust gas and the working fluid.

When the mixture of toluene (or benzene) and water is used for the working fluid, the behavior of water is complex. Although benzene and toluene are almost insoluble in water each other at the ambient temperature, the mutual solubility of benzene or toluene and water increases according to the temperature increase under the pressured condition, thereby finally making the homogeneous liquid state or the state near to it. At the pressure of 100 kg/cm², the mixture of toluene (or benzene) and water vaporizes in the state of the supercritical pressure or the sub-critical pressure.

Under the heating and pressured conditions as mentioned above, the heat of dissolution is absorbed according to the advance of the mutual dissolution. The heat of dissolution is thermodynamically calculated from the interrelationship between the temperature and the mutual solubility. That is to say, at the temperature range or zone in which the mutual solubility advances, water dissolves in toluene or benzene prior to vaporization, whereby the heat of dissolution is absorbed, and the pinch point of the heat exchange between the exhaust gas and the working fluid is broadened.

When the mixture of xylene and water are used for the working fluid, the thermal efficiency of cycle is enough high. However, in the xylene-water system, the heat-resisting property of said system is insufficient at the heating and pressured conditions and the mutual solubility between xylene and water is very few. So that, in the xylene-water system, it is impossible to expect the effect obtainable from the toluene (or benzene)-water system, and also it is the reason why the working fluid of the present invention is limited to the toluene (or benzene)-water system.

Although the outline of the phase change of the mixture of toluene (or benzene) and water within the boiler at the heating and pressured conditions is mentioned above, the performance of the working fluid is mainly affected by the property of water according to the increase of water content in the working fluid, whereby the thermal efficiency $\eta b$ of boiler depresses. The depression of $\eta b$ is remarkable when the temperature of exhaust gas $T_G$ is low, while the depression of $\eta b$ is few when the temperature of exhaust gas $T_G$ is high. And also the efficiency of boiler decreases when the inlet temperature $t_c$ of turbine is high, while the efficiency of boiler increases when the inlet pressure of turbine is high.

(A) The working fluid of toluene-water system

Figure 3:
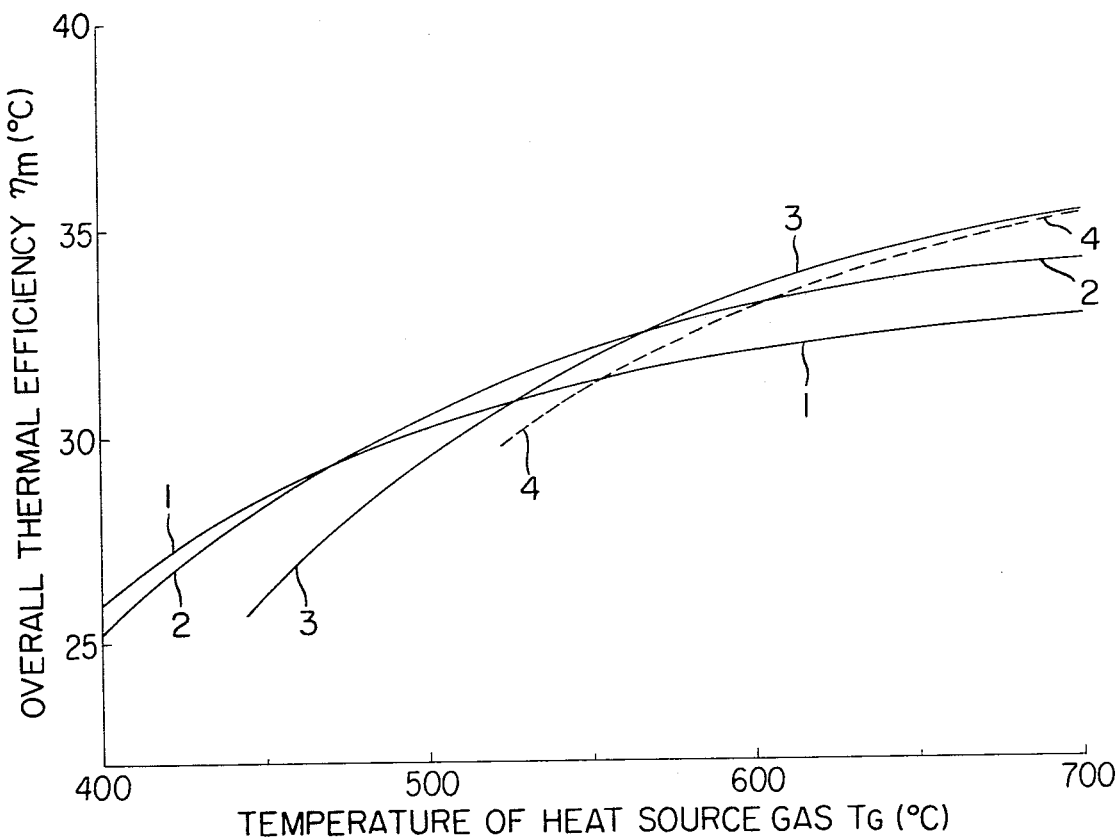
FIG. 3 shows the graph of indicating the interrelationship between the temperature of heat source gas $T_G$ and the maximum overall thermal efficiency $\eta m$ in the Rankine cycle using the working fluid of the toluene-water system.

FIG. 3 shows the interrelationship between the temperature of heat source gas $T_G$ and the maximum overall thermal efficiency $\eta m$ (maximum value of $\eta$) in the Rankine cycle using the working fluid of the toluene-water system in the condition of the inlet pressure of turbine of 100 mg/cm² and the optimum inlet temperature of turbine on the assumption that the overall thermal efficiency $\eta$ of exhaust heat is shown by the following formula $\eta = \eta b \times \eta c$.

In FIG. 3, curves 1, 2, 3 and 4 show the interrelationship between the overall thermal efficiency $\eta m$ (%) and the temperature $T_G$ (°C.) of heat source gas, when the mixtures of water and toluene in the ratio of 0.5, 1.0 (0.9026), 2 and 3 moles of water per one mole of toluene are used for the working fluid respectively. In FIG. 3, the inlet pressure of turbine is 100 kg/cm², the inlet temperature (the optimum temperature) of turbine is less than 450° C., the temperature difference between the exhaust gas of the exhaust heat boiler and the working fluid is more than 36° C. The curve 4 being indicated by the dotted line shows the case that water condensates at the low pressure stage of turbine on the assumption of ideal turbine.

From FIG. 3, it has been found that in order to obtain the maximum overall thermal efficiency $\eta m$, the mole ratio of water to toluene in the working fluid of the toluene-water system is in the ratio of 0.5-1.0 moles water per one mole toluene at the temperature $T_G$ of heat source gas (exhaust gas) of 400°-500° C.; said mole ratio is in the ratio of 1.0-2.0 moles water per one mole toluene at said temperature of 500°-600° C.; and said mole ratio is in the ratio of about 2 moles per one mole toluene at said temperature of 600°-700° C. thereby giving the maximum overall thermal efficiency $\eta m$.

Practically, in considerations of the power of feed pump, the performance of the exhaust heat boiler and the maximum usable temperature of the working fluid of the toluence-water system, the water content in the mixture of toluene and water for obtaining the maximum overall thermal efficiency $\eta m$ is suitable to be 30-65 mol %, 40-75 mol % and 50-80 mol % at the operating temperatures of 400°-500° C., 500°-600° C. and 600°-700° C. respectively.

(B) The working fluid of benzene-water system

The water content in the suitable composition of the working fluid of the benzene-water system is rather less than that of the toluene-water system. In order to obtain the maximum overall thermal efficiency $\eta m$, the mole ratio of water to benzene is in the ratio of 0.3-0.5 moles of water per one mole of benzene at the temperature of heat source gas $T_G$ of 400°-500° C., said ratio is in the ratio of 0.5-1.0 moles of water per one mole of benzene at said temperature of 500°-600° C. and said ratio is in the ratio of 1.0-2.0 moles of water per one mole of benzene at said temperature of 600°-700° C.

When the overall thermal efficiency $\eta m$ of the benzene-water system is compared with that of the toluene-water system as deduced from the comparison of the thermal efficiency $\eta c$ in FIGS. 1 and 2, the value of $\eta m$ is almost same in both said system at the temperature range $T_G$ of the exhaust gas of 400°-500° C., in which the water content of the working fluid is less. According to the increase of said temperature $T_G$, the overall thermal efficiency $\eta m$ of the benzene-water system decreases in comparison with that of the toluene-water system.

When the temperature of the exhaust gas in the present gas turbine is assumed to be about 500° C., almost the same extent of the overall thermal efficiency is obtained in the benzene-water system and the toluene-water system. However, as the temperature of the exhaust gas increases by the advance of the gas turbine technology in future, the working fluid of the toluene-water system comes to profitable. The more the temperature $T_G$ of the exhaust gas increases, the more the inlet temperature $t_c$ of turbine which gives the maximum overall thermal efficiency $\eta m$ increases. However, as the inlet temperature $t_c$ of turbine is limited to the thermal stability of toluene, the reheating cycle in which the vapor of the working fluid coming out from the high pressure turbine is reheated within the exhaust heat boiler and expanded within the low pressure turbine, is concluded to be advantage. According to the increase of the temperature $T_G$ of the exhaust gas, it is advantage that the mixing ratio of water to toluene increases thereby reducing the power of feed pump. Under the condition that the working fluid having high mixing ratio of water to toluene is used for the reheating cycle, it is the advantage to be able to use the high inlet pressure of turbine. In the reheating cycle, the inlet pressure of turbine can be increased to 100-200 kg/cm².

Figure 4:
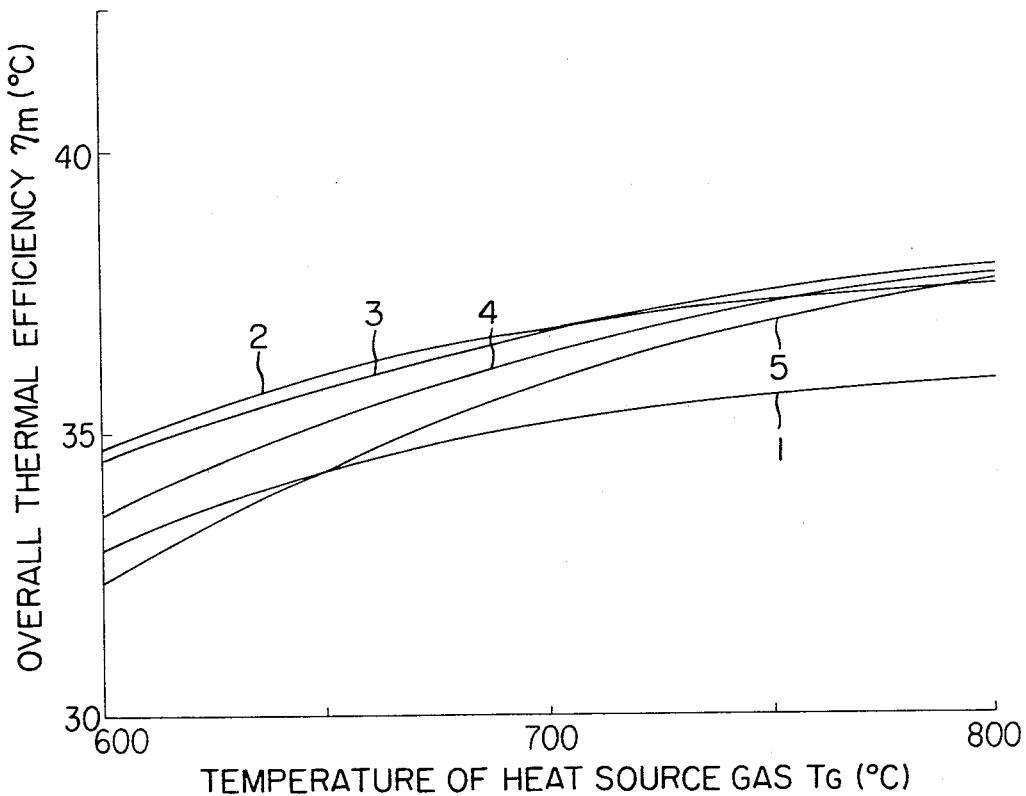
FIG. 4 shows the graph of indicating the interrelationship between the maximum overall thermal efficiency $\eta m$ and the temperature of heat source gas $T_G$ (°C.) in the reheating cycle using the working fluid of the toluene-water system.

FIG. 4 shows the interrelationship between the overall thermal efficiency $\eta m$ and the temperature of heat source gas $T_G$ (°C.) in the reheating cycle at the maximum super-heated temperature of the working fluid of 450° C. and under the inlet pressure of turbine of 150 kg/cm², using the working fluid of toluene-water system.

In FIG. 4, curves 1, 2, 3, 4 and 5 show the interrelationship between the overall thermal efficiency $\eta m$ (%) and the temperature $T_G$ (°C.) of heat source gas in the reheating cycle having the inlet pressure of turbine of 150 kg/cm², when the mixture of water and toluene in the mole ratio of 1.0 (0.9026), 2, 3, 5 and 10 moles of water per one mole of toluene are used for the working fluid of the toluene-water system respectively. The overall thermal efficiency in the reheating cycle under the inlet pressure of turbine of 150 kg/cm² is expected to be about 2% increase over that of the Rankdine cycle operating under the inlet pressure of turbine of 100 kg/cm². The mixing ratio of water in the toluene-water system for obtaining the maximum overall thermal efficiency $\eta m$ is in the ratio of 2–3 moles of water per one mole of toluene. In the actual operation, the suitable concentration of water in the toluene-water system is in the range of 60–90 mol %. In the reheating cycle, it is possible to use the benzene-water system for the working fluid. In this case, the maximum overall thermal efficiency $\eta m$ is given at the operating temperature of 600°–800° C., when the benzene-water system is used for the working fluid in the ratio of 1–2 moles of water per one mole of benzene. While the overall thermal efficiency using the working fluid of the benzene-water system decreases by 1–2% in comparison with that of the toluene-water system.

When benzene or toluene is heated, both the decomposition and polymerization occurs. In the decomposition, hydrogen and methane are formed, while in the polymerization, 2 molecular polymerization mainly occurs, but any sludge harmful to the boiler does not form. The acceleration of the decomposition and polymerization of benzene and toluene is not recognized in the presence of water. When benzene or toluene is used for the working fluid, the decomposition and polymerization of benzene and toluene are very few at the inlet temperature of turbine of 400° C., since the working fluid is maintained at the high temperature for very short period. Although it is possible to increase the inlet temperature of turbine by providing suitable removal apparatus of polymer within the cycle, the maximum inlet temperature of turbine is reasonable to be 450°–480° C.

When benzene and toluene of the composition of the working fluid are compared with each other, toluene is somewhat inferior to benzene in the thermal stability. However, toluene is superior to benzene in the overall thermal efficiency $\eta m$ at the high temperature $T_G$ of heat source gas. The hazardous property such as flammability of benzene and toluene are the same extent whereby the strict countermeasure of the security is required. As to the poisonous character, toluene is less than benzene, in the practical use, toluene is suitable to use for the component of the working fluid.

The overall thermal efficiency $\eta m$ in the sole use of benzene or toluene for the working fluid is expected to be the same extent to the overall thermal efficiency of the working fluid of the toluene-water system or the benzene-water system. However, when the gas turbine technology is in advance in future, it is clear that the working fluid of the toluene (or benzene)-water system is advantageous to use. And at present, said working fluid has the advantages of using the pump having the small size for supplying the working fluid to the boiler and of charging the small power. If benzene or toluene is solely used for the working fluid, the temperature of the working fluid at the outlet of turbine comes to high. Although the specific gravity of the working fluid coming from the outlet of turbine becomes large in the toluene (or benzene)-water system, it is advantage to be able to use the turbine having the small size. If benzene or toluene is solely used for the working fluid, the preventive measure against the leakage of the working fluid is required in view of the security of environment. While if the toluene (or benzene)-water system is used for the working fluid, it makes possible to easily adopt the water sealing or the steam sealing. At present, practically, benzene or toluene is not solely used for the working fluid. However, it is clear that the toluene (or benzene)-water system is of advantage on the practical point of view.

In the present invention, it comes to possible to recover the exhaust heat with high thermal efficiency by selecting the optimum composition of the working fluid and the optimum operating condition according to the temperature of exhaust gas. If the temperature of exhaust gas of 500° C. is adopted in the gas turbine technology at present, it is preferable to use the working fluid containing 30–65 mole % of water in the toluene (or bebzene)-water system. The maximum overall thermal efficiency is obtained using the working fluid containing about 40 mole % of water in the benzene-water system, and about 50 mole % of water in the toluene-water system respectively. When the temperature of the exhaust gas comes to high according to the advance of the gas turbine technology in future, it is advantages of increasing the mixing ratio of water in the working fluid or of adopting the reheating cycle as mentioned above in detail.

The study as mentioned above has been carried out on the basis of the calculation on the assumption that the mixed vapor of toluene (or benzene)-water system is the ideal solution. However, the thermodynamic data of said mixed vapor under the high pressure show the deviation from that of the ideal solution. At present, the most reliable estimation method is that using so-called "two fluid model" [Breedveld, G. J. F. and Prausnitz, J. M., AlCh E. J., 19 783 (1973)]. According to said estimation method, the more the thermal efficiency $\eta c$ becomes large, the more the boiler efficiency $\eta b$ becomes small. The overall thermal efficiency $\eta m$ of the exhaust heat comes to about 0.3–0.4% increase. Said estimation method gives the large influence on the optimum inlet temperature $t_c$ of turbine. So that, said temperature moves toward the low temperature of about 20° C. than the temperature which is calculated as the ideal solution. Said estimation method gives only the slight influence on the optimum water content of the working fluid.

Table 2 shows the composition of the working fluid suitable for the present invention.

TABLE 2

The water content (mol %) of the working fluid useful to the present invention

| Temperature (°C.) of the exhaust heat | The toluene-water system | The benzene-water system |
|---|---|---|
| Ranking cycle | | |
| 400° C. | 30–50 | 20–45 |
| 500° C. | 40–65 | 30–55 |
| 600° C. | 50–75 | 40–65 |
| 700° C. | 60–80 | 45–75 |
| Reheating cycle | | |

TABLE 2-continued

The water content (mol %) of the working fluid useful to the present invention

| Temperature (°C.) of the exhaust heat | The toluene-water system | The benzene-water system |
| --- | --- | --- |
| 600° C. | 60–80 | 45–70 |
| 700° C. | 65–85 | 50–75 |
| 750° C. | 65–90 | 55–80 |

From Table 2, in the Rankine cycle at the temperature of the exhaust heat of 400°–700° C., it is suitable to use 20–80 mole % of water for the working fluid of the toluene (or benzene)-water system under the pressure of 70–150 kg/cm$^2$, while in the reheating cycle at the temperature of the exhaust heat of 600°–750° C., it is suitable to use 45–90 mole % of water for the working fluid of the toluene (or benzene)-water system under the pressure of 100–200 kg/cm$^2$.

Figure 5:
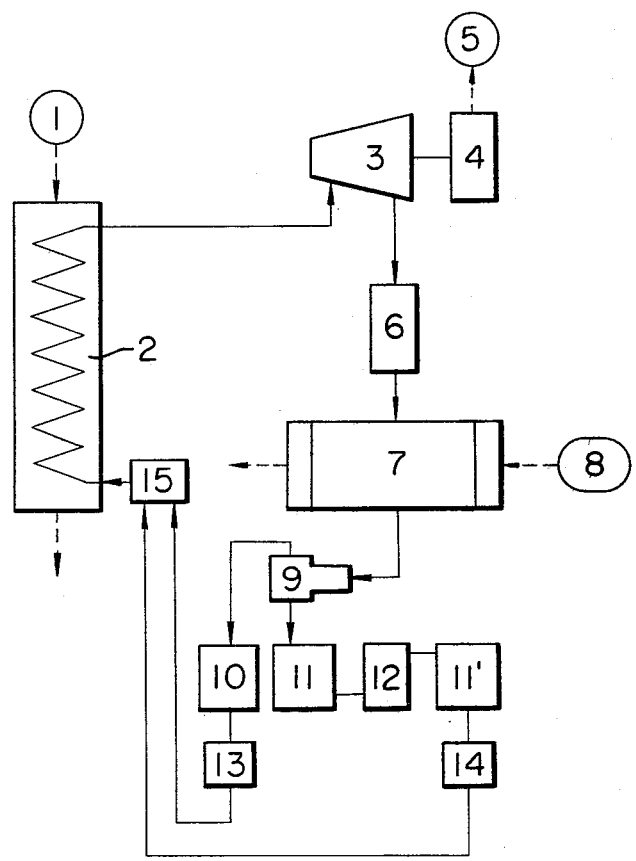
FIG. 5 shows a typical or standard flow sheet indicating the flow of substance and the apparatus of the present invention using the working fluid of the toluene (or benzene)-water system.

FIG. 5 shows the flow sheet of the apparatus for recovering the exhaust heat using the working fluid of the toluene (or benzene)-water system.

In FIG. 5, the exhaust gas coming out from the turbine 1 enters to the exhaust heat boiler 2 thereby vaporizing the working fluid. The vapor of the working fluid drives the turbine 3 to generate the electric power 5 by means of the generator 4. The vapor coming out from the turbine 3 enters the condenser 7 usable to condense the vapor of the working fluid via the polymer removing apparatus 6. Said condenser is cooled by the cold water 8 coming out from the outside. The condensate of the working fluid is separated to toluene (or benzene) and water by means of the separator 9. The separated toluene (or benzene) of the upper layer enters to the toluene (or benzene) tank 10, and is fed to the mixer 15 in which toluene (or benzene) is mixed with water via the pump 13 supplying for toluene (or benzene) to the mixer 15. While the separated water of the under layer enters to the water tank 11' via the desalting apparatus 12 of water and the tank 11, and is sent to the mixer 15 in which toluene (or benzene) is mixed with water in the predetermined mixing ratio by means of the pump 14. The resulted mixture of toluene (or benzene) and water is recycled to the exhaust heat boiler 2 as the working fluid. The exhaust heat boiler 2 is suitable to be the one-through boiler which is not provided with the drum and is provided with the tubes having fins. The pumps 13 and 14 send toluene (or benzene) and water to the mixer 15 in the predetermined ratio respectively, and the high boiling point polymer is removed from the working fluid in the polymer removing apparatus 6 by means of the partial condensation of the mixed vapor of the working fluid or the adsorption of polymer.

In the conventional steam cycle, when the temperature $T_G$ of exhaust gas is 500° C., the overall thermal efficiency $\eta m$ obtainable from the exhaust gas is about 25%, while in the Rankine cycle using the working fluid of the present invention, said efficiency is about 30%. When the temperature $T_G$ is about 700° C., the difference of the overall thermal efficiency in said both cases comes to almost null. In the reheating cycle, the overall thermal efficiency of said both case comes to almost same each other at the temperature $T_G$ of 750° C. However, in the present invention, since the specific gravity of the working fluid is large at the final stage of the turbine, and the entalpy drop per the unit weight of the working fluid is small, the size of turbine becomes small.

The working fluid of the present invention aims at the recovery for the exhaust heat of gas turbine. However, it is adopted to convert the heat energy coming from the substance having the sensible heat of 400°–750° C. in to work.

What is claimed is:

1. A process for recovering heat using the working fluid in a turbine characterized in that the working fluid is a mixture of 30 to 80 mole % water and toluene, wherein said water and toluene mixture is insoluable at ambient temperature and wherein the vapor cycle heat energy in the temperature range of 400° to 750° C. is converted into work.

2. A process for recovering heat using the working fluid in a turbine characterized in that the working fluid is a mixture of 60 to 90 mole % water and toluene, wherein said water and toluene mixture is insoluable at ambient temperature and wherein the vapor cycle heat energy in the temperature range of 600° to 750° C. is converted into work.

3. A process for recovering heat using the working fluid in a turbine characterized in that the working fluid is a mixture of 20 to 75 mole % of benzene and water, wherein said benzene is slightly soluable in said water, and in the vapor cycle heat energy the temperature range of 400° to 700° C. is converted into work.

4. A process for recovering heat using the working fluid in a turbine characterized in that the working fluid is a mixture of 45 to 80 mole % of benzene and water, wherein said benzene is slightly soluable in said water, and in the vapor cycle heat energy the temperature range of 600° to 750° C. is converted into work.

* * * * *